US009426771B2

(12) United States Patent
Peng et al.

(10) Patent No.: US 9,426,771 B2
(45) Date of Patent: Aug. 23, 2016

(54) METHOD FOR DETECTING CELL DISCONNECTION AND LOCATING DISCONNECTED CELL IN SON OF CELLULAR MOBILE COMMUNICATION SYSTEM (71) Applicant: Beijing University of Posts and Telecommunications, Beijing (CN)

(72) Inventors: Mugen Peng, Beijing (CN); Yong Li, Beijing (CN); Zhongyuan Zhao, Beijing (CN); Wenbo Wang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 14/647,251

(22) PCT Filed: Jun. 5, 2013

(86) PCT No.: PCT/CN2013/076764
§ 371 (c)(1),
(2) Date: May 26, 2015

(87) PCT Pub. No.: WO2014/082437
PCT Pub. Date: Jun. 5, 2014

(65) Prior Publication Data
US 2015/0304981 A1 Oct. 22, 2015

(30) Foreign Application Priority Data

Nov. 30, 2012 (CN) .......................... 2012 1 0504474

(51) Int. Cl.
*H04W 64/00* (2009.01)
*H04W 24/04* (2009.01)
*H04W 24/08* (2009.01)
*H04W 24/10* (2009.01)

(52) U.S. Cl.
CPC ............. *H04W 64/00* (2013.01); *H04W 24/04* (2013.01); *H04W 24/08* (2013.01); *H04W 24/10* (2013.01); *Y02B 60/50* (2013.01)

(58) Field of Classification Search
USPC ........................................... 455/456.1
See application file for complete search history.

(56) References Cited

U.S. PATENT DOCUMENTS

| 2011/0028181 | A1 | 2/2011 | Byun et al. |
| 2014/0200004 | A1* | 7/2014 | Wegmann ............. H04W 24/10 455/436 |

FOREIGN PATENT DOCUMENTS

| CN | 102325342 A | 1/2012 |
| CN | 102752788 A | 10/2012 |

(Continued)

OTHER PUBLICATIONS

International Search Report from International Application No. PCT/CN2013/076764 dated Aug. 22, 2013.

(Continued)

*Primary Examiner* — Kabir A Timory
(74) *Attorney, Agent, or Firm* — Marshall, Gerstein & Borun LLP (57) ABSTRACT In a monitoring region including multiple cells, UE reports KPI parameters and location information to an eNodeB when triggering an A3 event representing that QoS of a neighboring cell is better than a predefined offset of a serving cell. The eNodeB reports the KPI parameters and the location information to an OAM device in each monitoring cycle. The OAM device classifies UEs according to the KPI parameters and a cluster analysis method, and determines according to a cluster analysis result whether there is a disconnected cell in the monitoring region; when determining that there is a disconnected cell in the monitoring region, counts the number of disconnected cells, determines disconnection types of the disconnected cells, locates the disconnected cells according to the location information of the UEs in the SON, and triggers a compensation measurement for each disconnected cell according to the disconnection type of the disconnected cell.

7 Claims, 4 Drawing Sheets (56) References Cited

FOREIGN PATENT DOCUMENTS

CN 102932826 A 2/2013
EP 2139278 A1 12/2009

OTHER PUBLICATIONS

Office Action in CN Application No. 201210504474.0 dated Jul. 23, 2014, 17 pages.

* cited by examiner

METHOD FOR DETECTING CELL DISCONNECTION AND LOCATING DISCONNECTED CELL IN SON OF CELLULAR MOBILE COMMUNICATION SYSTEM

CROSS-REFERENCE TO RELATED APPLICATIONS

This application claims the benefit and priority of Chinese Patent Application No. 201210504474.0, filed on Nov. 30, 2012. The entire disclosures of each of the above applications are incorporated herein by reference.

TECHNICAL FIELD

The present disclosure relates to radio communication technologies, particularly to a method for detecting cell disconnection and locating a disconnected cell in a Self-Organizing Network (SON) of a cellular mobile communication system, and more particularly to a method for detecting cell disconnection and locating a disconnected cell in a self-healing section of a SON of a cellular mobile communication system.

BACKGROUND

Home evolved Nodes B (eNodeBs) and relay stations are introduced into a next generation broadband mobile communication system called International Mobile Telecommunications-Advanced (IMT-Advanced), and an enhanced Multiple-Input Multiple-Output (MIMO) technology, a Coordinated Multiple Points (COMP) technology and a carrier aggregation technology are adopted. Accordingly, a quantity of parameters and data are to be processed, which makes network configuration and optimization complex, increases the difficulty of detecting and compensating a disconnected cell and increases manual operation and maintenance costs. In this case, as an advanced radio communication technology, a SON technology is noticed by both academia and industry.

The SON of the IMT-Advanced system has self-configuration, self-optimization and self-healing functions. Herein, the self-healing function is illustrated as follows. The SON can automatically, rapidly and accurately detect and locate a failure influencing network performance, and can automatically return to a normal operation state, thereby ensuring a continuous and high-quality communication process of User Equipment (UE). In order to implement the self-healing function, a cellular mobile communication network should have a function of detecting cell disconnection and locating a disconnected cell and a function of performing performance compensation for the disconnected cell. The function of detecting the cell disconnection and locating the disconnected cell is a basis and precondition of implementing the self-healing function.

At present, some failures resulting in cell disconnection are found by an Operation Administration and Maintenance (OAM) device through an alarm or performance monitor. Accordingly, it usually takes a long time (for example, several hours or several days) to find some cell disconnection, or some cell disconnection cannot be found unless performance analysis or user feedback is performed for a long time. Further, a large amount of manual analysis is necessary for failure detection and recognition, and the OAM device constantly accesses an eNodeB, which results in the high costs and low efficiency of cell disconnection detection. Accordingly, the cell disconnection detection provided in the SON technology is noticed by the industry because the cell disconnection detection provided in the SON technology can improve OAM efficiency and reduce manual interference and OAM costs.

In the cell disconnection detection solution provided in the SON technology, measurement information is collected from UEs, eNodeBs and OAM devices, and data information for accurately determining whether a cell is disconnected is obtained. However, because data information that can be detected and obtained is incomplete and the performance of a radio network changes in real time, it is necessary to provide a high-efficient method for detecting cell disconnection and locating a disconnected cell, thereby accurately detecting the cell disconnection and locating the disconnected cell by use of limited data information.

SUMMARY

An embodiment of the present disclosure provides a method for detecting cell disconnection and locating a disconnected cell in a SON of a cellular mobile communication system, so as to find a network failure in time and provide a high-quality service for users.

A method for detecting cell disconnection and locating a disconnected cell in a Self-Organizing Network (SON) of a cellular mobile communication system, comprising:

in a monitoring region including multiple cells, reporting, by User Equipment (UE), Key Performance Indicator (KPI) parameters and location information to an evolved Node B (eNodeB) when triggering an A3 event representing that Quality of Service (QoS) of a neighboring cell is better than a predefined offset of a serving cell;

reporting, by the eNodeB, the KPI parameters and the location information to an Operation Administration and Maintenance (OAM) device in each monitoring cycle; and classifying, by the OAM device, UEs according to the KPI parameters and a cluster analysis method; determining according to a cluster analysis result whether there is a disconnected cell in the monitoring region; when determining that there is a disconnected cell in the monitoring region, counting the number of disconnected cells, determining disconnection types of the disconnected cells, locating the disconnected cells according to the location information of the UEs in the SON, and triggering a compensation measurement for each disconnected cell according to the disconnection type of the disconnected cell.

In the method provided by the embodiment, a cluster analysis technology in data mining may automatically detect the cell disconnection and locate the disconnected cell. The cluster analysis technology may also automatically classify data based on various cluster algorithms even if there is not any prior knowledge. In some algorithms, for example, a K-means algorithm, the number of classifications should be defined in advance. In other algorithms, for example, an Affinity Propagation (AP) algorithm, the number of classifications is not defined in advance, but points that can be taken as cluster centers should be found according to a predefined rule, wherein each classification corresponds to one cluster center. And then, the number of classifications output by a cluster result is determined according to the number of the points. For a communication network in which disconnection conditions are unknown, because the number of disconnected cells is unable to be foreknown, it is necessary to provide a dynamic cluster algorithm to classify data collected from UEs, so as to distinguish disconnected cells with different disconnection degrees.

In the method provided by the embodiment, the dynamic cluster algorithm in data mining may classify UEs triggering an A3 event. In a conventional cluster algorithm, the number of classifications should be defined in advance, or it cannot be ensured that the number of classifications is optimal. However, in the dynamic AP cluster algorithm provided by the embodiment of the present disclosure, cluster qualities corresponding to different numbers of classifications are compared to output an optimal classifying result, wherein the optimal classifying result may be achieved when the number of classifications is optimal. Different numbers of classifications means that the UEs may be classified for many times, and the number of classifications obtained for the first time is different from the number of classifications obtained for the second time. Accordingly, even if the number of disconnected cells and disconnection types of the disconnected cells are unknown, a normal UE can be distinguished from UEs with different disconnection degrees by the dynamic AP cluster algorithm. Further, when multiple cells in a monitoring region are disconnected and the disconnection types of the disconnected cells are different, whether there are disconnected cells is detected, and the disconnected cells with different disconnection types are located and distinguished. And then, different disconnection compensation measurements are triggered for the disconnected cells with different disconnection types.

In the method provided by the embodiment of the present disclosure, it is unnecessary to set a KPI parameter model for determining whether a cell is normal for the cell, but all UEs triggering the A3 event in each monitoring region are classified according to various KPI parameters and location information collected from the UEs, thereby locating the disconnected cells. Each step of the method is simple, calculation complexity is low, and manual interference is not needed. In this way, energy consumption and OAM costs caused by a function module for collecting the KPI parameters and the location information can be reduced, and an inaccurate determination caused by an improper KPI parameter model can be avoided. Accordingly, the method provided by the embodiment of the present disclosure has good application foreground.

DETAILED DESCRIPTION

In order to make the object, technical solution and merits of the present disclosure clearer, the present disclosure will be illustrated in detail hereinafter with reference to the accompanying drawings and embodiments.

An embodiment of the present disclosure provides a method for detecting cell disconnection and locating a disconnected cell in a SON of a cellular mobile communication system, so as to solve a problem that the performance determination and failure diagnosis of a radio network cannot be performed effectively because of a mass of information. The method is implemented as follows. In a monitoring region including multiple cells, each UE reports its KPI parameters and location information to an eNodeB when triggering an A3 event. The A3 event refers to a case that the Quality of Service (QoS) of a neighboring cell is better than a predefined offset of a serving cell. In each monitoring cycle, the eNodeB reports the received KPI parameters and location information to an OAM device. The OAM device classifies UEs according to the received KPI parameters and according to a cluster analysis method. According to a cluster analysis result, the OAM device determines whether there is a disconnected cell in the monitoring region. If there is a disconnected cell, the number of disconnected cells is counted, and the disconnection types of the disconnected cells are determined. The disconnected cells are located according to location information of UEs in each classification, and a compensation measurement is triggered for each disconnected cell according to the disconnection type of the disconnected cell. By the method provided by the embodiment of the present disclosure, a network failure can be found in time and a proper compensation measurement can be triggered.

The cluster analysis method provided by the embodiment of the present disclosure is a dynamic AP algorithm. In a conventional AP algorithm, the number of classifications is not determined in advance, and a predefined bias parameter p can decide a possibility that each data point becomes a cluster center. The larger p is, the larger the number of cluster centers is, the larger the number of classifications output by the algorithm is. When there is no prior knowledge, the bias parameter p is defined as a middle value $p_m$ among similarity degrees between data points, thereby making the number of classifications proper. In some cases, when the bias parameter is set as $p_m$, an optimal cluster result cannot be achieved by the AP algorithm. Further, when the cluster result output by the AP algorithm oscillates (that is, the cluster result generated during an iterative process constantly oscillates), a method for removing the oscillation is adjusting the bias parameter p step by step until the oscillation disappears.

In order to solve the above problems, the dynamic AP algorithm provided by the embodiment of the present disclosure is implemented as follows. An adjustment range of the bias parameter p is determined, and then two step sizes for dynamically adjusting the bias parameter p are set, thereby rapidly removing the oscillation and generating multiple cluster results corresponding to different numbers of classifications. Afterwards, an optimal cluster result is selected from the generated cluster results according to a cluster quality evaluation indicator. Because the dynamic adjustment range of the bias parameter p and two step sizes for dynamically adjusting the bias parameter p are introduced to the algorithm, the algorithm is called the dynamic AP algorithm.

Figure 1:
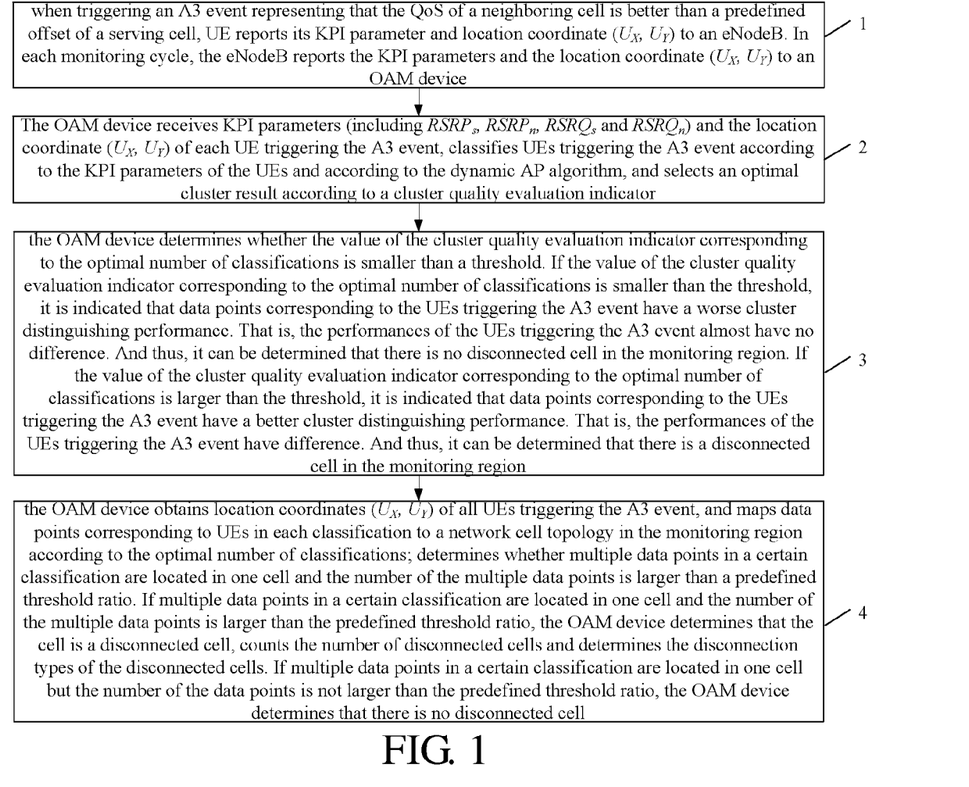
FIG. 1 is a flowchart illustrating a method for detecting cell disconnection and locating a disconnected cell in a SON according to an embodiment of the present disclosure.

FIG. 1 is a flowchart illustrating a method for detecting cell disconnection and locating a disconnected cell in a SON according to an embodiment of the present disclosure. As shown in FIG. 1, the method includes following blocks.

At block 1, when triggering an A3 event representing that the QoS of a neighboring cell is better than a predefined offset of a serving cell, UE reports its KPI parameters and location coordinate $(U_X, U_Y)$ to an eNodeB. In each monitoring cycle, the eNodeB reports the KPI parameters and the location coordinate $(U_X, U_Y)$ to an OAM device. The KPI parameters include maximum Reference Signal Receiving Power $RSRP_s$ and maximum Reference Signal Receiving Quality $RSRQ_s$ of the serving cell, and maximum $RSRP_n$ and maximum $RSRQ_n$ of the neighboring cell. The subscripts s and n are the initial of the serving cell and the initial of the neighboring cell respectively.

At block 2, the OAM device receives KPI parameters (including $RSRP_s$, $RSRP_n$, $RSRQ_s$ and $RSRQ_n$) and the location coordinate $(U_X, U_Y)$ of each UE triggering the A3 event, classifies UEs triggering the A3 event according to the KPI parameters of the UEs and according to the dynamic AP algorithm, and selects an optimal cluster result according to a cluster quality evaluation indicator. An important process in the embodiment of the present disclosure is classifying the UEs triggering the A3 event according to the dynamic AP algorithm. In this embodiment, block 2 includes following processes (a) to (c).

In process (a), the OAM device constructs a set $D=\{X_1, X_2, \ldots, X_i, X_N\}$ including the UEs triggering the A3 event and the KPI parameters of each UE. The subscript i is a natural number representing the serial number of UE. The largest value of the subscript i is N, and thus $X_i$ represents the $i^{th}$ UE triggering the A3 event. Each UE carries four KPI parameters which construct a KPI parameter vector $X_i = (RSRP_{si}, RSRP_{ni}, RSRQ_{si}, RSRQ_{ni})$ of the UE. The KPI parameter vector is used as a data point participating in the algorithm.

In process (b), all UEs in the set $D=\{X_1, X_2, \ldots, X_i, \ldots, X_N\}$ are classified according to the dynamic AP algorithm, and thus N data points $X_1, X_2, \ldots, X_i, \ldots, X_N$ in the set D participates in the dynamic AP algorithm.

The dynamic AP algorithm in process (b) includes following processes (b1) to (b7).

In process (b1), when i≠k and an Euclidean distance is used as a measurement indicator of similarity degree, a similarity degree $s(i,k)$ between any two data points $X_i$ and $X_k$ is calculated, where $s(i,k)=-\|X_i-X_k\|^2$ The subscript k is a natural number presenting the serial number of UE, and the largest value of k is N.

When i=k, a bias parameter $p_k=s(k,k)$ of data point $X_k$ is defined. In this case, suppose possibilities that all data points become cluster centers are identical, that is, i.e., $s(k,k)=p_k=p$. A matrix $S=[s(i,k)]_{N\times N}$ is constructed according to the similarity degree $s(i,k)$ between any two data points and the bias parameters $p=p_k=s(k,k)$ of the N data points. The number of rows and the number of columns in the matrix are both N. Further, a dynamic adjustment range $p \in [p_{min}, p_{max}]$ of the bias parameter p is introduced. In this case, the number of classifications corresponding to the dynamic adjustment range of the bias parameter p is within $[2, \lceil \sqrt{N} \rceil]$. Afterwards, an initial bias parameter is set, i.e., $p=p_{max}$. In the embodiment of the present disclosure, the size of $p_k$ decides the possibility that the data point $X_k$ becomes a cluster center. The larger $p_k$ is, the larger the possibility that the data point $X_k$ becomes the cluster center is.

In process (b2), according to following three formulas associated with a response degree $r(i,k)$ and an action degree $a(i,k)$ between any two data points $X_i$ and $X_k$, an iterative operation of a conventional AP cluster algorithm is performed, and during each iterative operation, two parameters $r(i,k)$ and $a(i,k)$ are both updated.

$$r(i,k) = s(i,k) - \max_{k' \neq k}\{a(i,k') + s(i,k')\},$$

where k'≠k. The response degree $r(i,k)$ represents a degree that the data point $X_k$ is suitable as the cluster center of the data point $X_i$.

When i≠k $$a(i,k) = \min\left\{0, r(k,k) + \sum_{i' \in \{i,k\}} \max\{0, r(i',k)\}\right\}.$$

When i=k $$a(k,k) = \sum_{i' \neq k} \max\{0, r(i',k)\},$$

where i'≠i and k'≠k. The action degree $a(i,k)$ represents a degree that it is suitable for the data point $X_i$ to select the data point $X_k$ as the cluster center.

In process (b3), a damping factor $\lambda \in [0,1]$ is introduced into each iterative operation. In this case, according to a response degree and an action degree that are obtained during the last iterative operation of two formulas $r(i,k)^t = (1-\lambda)r(i,k)^{t-1} + \lambda r(i,k)^t$ and $a(i,k)^t = (1-\lambda)a(i,k)^{t-1} + \lambda a(i,k)^t$ and according to the response degree and the action degree that are obtained during the current iterative operation in process (b2), a weight update operation is performed on the response degree $r(i,k)$ and the action degree $a(i,k)$ during each iterative operation. t represents the number of iterative operations. In this way, the oscillation of the cluster result during the iterative operation can be avoided.

In process (b4), after each iterative operation, the cluster center of the data point $X_i$ is determined according to a formula $$\text{center}_i = \arg\max_k \{r(i,k) + a(i,k)\}.$$

$\text{center}_i$ is the cluster center of the data point $X_i$, and the number of cluster centers generated after the iterative operation is equal to the number of classifications into which all UEs in $D=\{X_1, X_2, \ldots, X_i, \ldots, X_N\}$ are classified.

In process (b5), during the iterative operation, it is determined whether the cluster result is stable. If the cluster result is stable, it is indicated that the algorithm converges, a final cluster result is obtained and process (b7) is performed. If the cluster result still oscillates when the number of iterative operations in the algorithm has been equal to a maximum value, it is indicated that the algorithm cannot converge, and process (b6) is performed.

In process (b6), the value of the bias parameter p is subtracted by the predefined first step size $p_{step1}$, and process (b2) is performed.

In process (b7), after obtaining a cluster result, the value of the bias parameter p is subtracted by the predefined second step size $p_{step2}$ and process (b2) is performed until the value of the bias parameter p falls to a floor $p_{min}$ of the dynamic adjustment range of the predefined bias parameter p. In this way, different cluster results corresponding to different numbers of classifications can be achieved in process (b7), and further cluster quantities of the different classifying results corresponding to different numbers of classifications may be compared, so as to achieve the optimal classifying result.

In process (c), a cluster quality evaluation indicator $$SL(j) = \frac{b(j) - a(j)}{\max\{a(j), b(j)\}}$$

is used to evaluate the cluster quality of each data point $X_j$, and further cluster qualities corresponding to different numbers of classifications are evaluated. The subscript j is a natural number representing the serial number of UE, and the largest value of the subscript j is N. Process (c) is implemented as follows.

Suppose the number of classifications $c=\{c_1, c_2, \ldots, c_i, \ldots c_K\}$ is K, and $X_j$ belongs to a classification $c_i$. a(j) is an average value of distances between the data point $X_j$ and other data points in the classification $c_i$. If $d(X_j, c_{other})$ is an average value of distances between the data point $X_j$ and all data points in another classification $c_{other}$, $b(j)=\min\{d(X_j, c_{other})\}$ is a minimum one of average values, each of which is an average value of distances between the data point $X_j$ and data points in one of other classifications $c_{other}$, where $c_{other} \in \{c_1, c_2, \ldots, c_k\}$ and $c_{other} \neq c_i$. The average cluster quality of the classification $c_i$ is $$SL_{av}(c_i) = \frac{1}{m} \sum_{j=1}^{m} SL(j).$$

m is the number of data points in the classification $c_i$. The minimum cluster quality $SL_{min}(K)=\min\{SL_{av}(c_i)\}$ is obtained from $SL_{av}(c_i)$ of $c=\{c_1, c_2, \ldots, c_K\}$, and is taken as a classification with the worst cluster quality when the data points are classified into K classifications. The cluster quality includes an intra-classification compact degree and an inter-classification distinguishing degree. A maximum value is searched from multiple cluster quality evaluation indicators $\{SL_{min}(K)\}$ corresponding to multiple classifying results, wherein the number of classifications corresponding to each of the multiple classifying results is within a range from 2 to $\lceil\sqrt{N}\rceil$ and is determined by the bias parameter $p \in [p_{min}, p_{max}]$. K corresponding to the maximum value is the optimal number of classifications, that is, the optimal number of classifications is $$\text{opti\_cluster} = \arg \max_K \{SL_{min}(K)\}.$$

At block 3, the OAM device determines whether the value of the cluster quality evaluation indicator corresponding to the optimal number of classifications is smaller than a threshold. If the value of the cluster quality evaluation indicator corresponding to the optimal number of classifications is smaller than the threshold, it is indicated that data points corresponding to the UEs triggering the A3 event have a worse cluster distinguishing performance. That is, the performances of the UEs triggering the A3 event almost have no difference. And thus, it can be determined that there is no disconnected cell in the monitoring region. If the value of the cluster quality evaluation indicator corresponding to the optimal number of classifications is larger than the threshold, it is indicated that data points corresponding to the UEs triggering the A3 event have a better cluster distinguishing performance. That is, the performances of the UEs triggering the A3 event have difference. And thus, it can be determined that there is a disconnected cell in the monitoring region.

At block 4, the OAM device obtains location coordinates $(U_X, U_Y)$ of all UEs triggering the A3 event, and maps data points corresponding to UEs in each classification to a network cell topology in the monitoring region according to the optimal number of classifications; determines whether multiple data points in a certain classification are located in one cell and the number of the multiple data points is larger than a predefined threshold ratio. If multiple data points in a certain classification are located in one cell and the number of the multiple data points is larger than the predefined threshold ratio, the OAM device determines that the cell is a disconnected cell, counts the number of disconnected cells and determines the disconnection types of the disconnected cells. If multiple data points in a certain classification are located in one cell but the number of the data points is not larger than the predefined threshold ratio, the OAM device determines that there is no disconnected cell.

The inventor has performed multiple emulation experiences according to the method provided by the embodiment of the present disclosure, and an emulation scenario and an evaluation result will be illustrated hereinafter.

Figure 2:
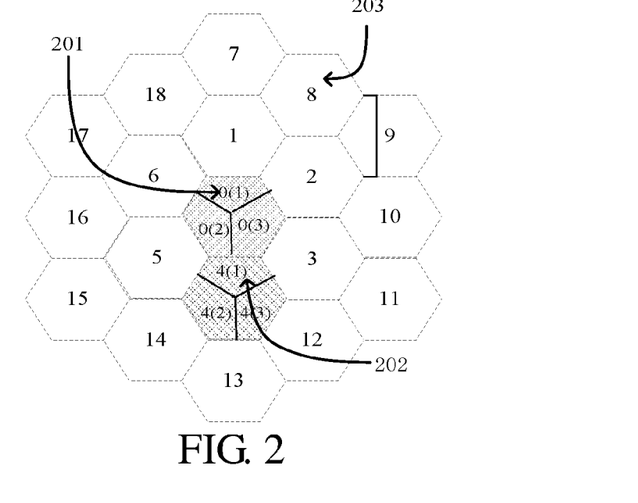
FIG. 2 is a diagram illustrating two cells with different disconnection degrees in an emulation scenario according to an embodiment of the present disclosure.

FIG. 2 is a diagram illustrating two cells with different disconnection degrees in an emulation scenario according to an embodiment of the present disclosure. Referring to FIG. 2, suppose a LTE system includes 19 cells and system parameters shown in Table 1 are used, the method provided by the embodiment of the present disclosure is illustrated as follows. The antenna gain of a sector 0 (1) is set, which is dropped by 50 dBi compared with a normal antenna gain, and the antenna gain of a sector 4 (1) is dropped by 100 dBi compared with the normal antenna gain, that is, cells 201 and 202 are disconnected cells with different disconnection degrees, and another cell 203 is a normal cell.

Table 1 shows system emulation parameters in a monitoring region of the emulation scenario shown in FIG. 2. Cells 201 and 202 are set as disconnected cells with different disconnection degrees according to different drop degrees of antenna gain.

TABLE 1

| system emulation parameters | parameter configuration |
| --- | --- |
| emulation scenario | macro cell in city |
| cell layout | 19 cells and 3 sectors/cells |
| user distribution | uniform distribution |
| link loss model | L = 128.1 + 37.6$\log_{10}$ R |
| difference between antenna gain of sector 0(1) and antenna gain of normal cell | 50 dBi |
| difference between antenna gain of sector 4(1) and antenna gain of normal cell | 100 dBi |
| shadow fading standard difference | 8 dB |
| initial cell selection standard | location based access |
| total transmission power of eNodeB | 46 dBm |
| the number of terminal users | 40 users/sectors |
| service type | Full Buffer |
| switch threshold | 0.5 dB |
| switch triggering time | 80 ms |

Figure 3:
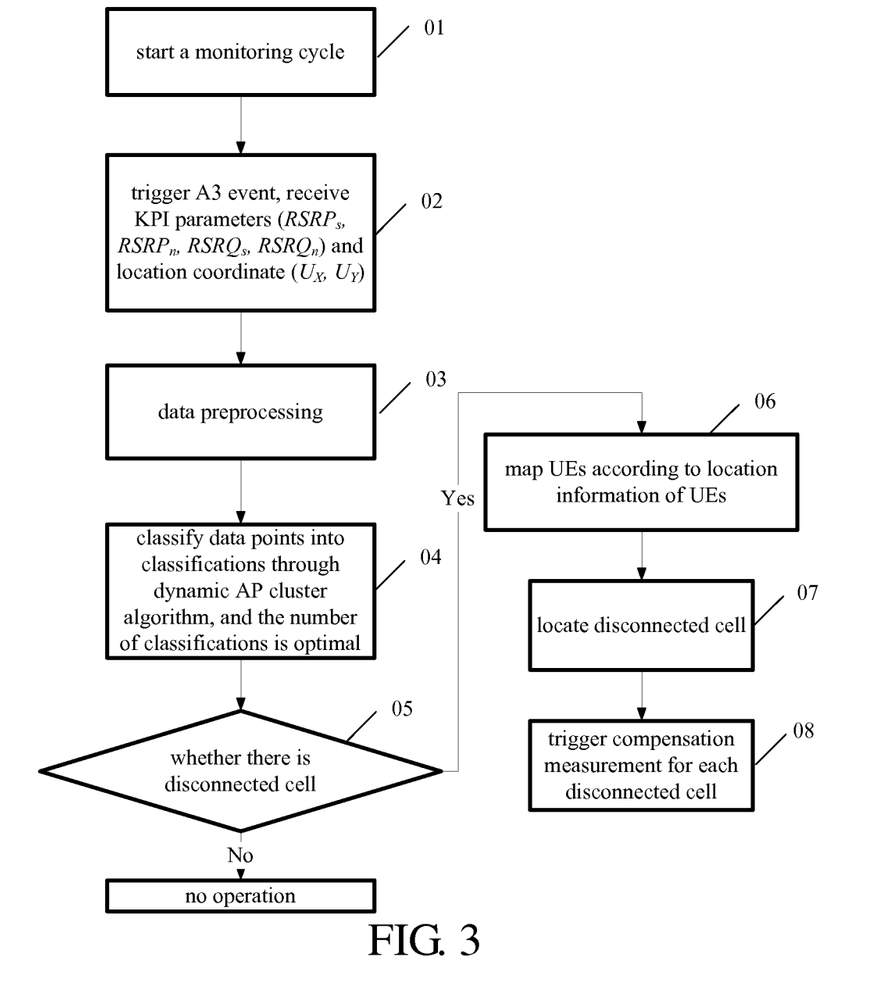
FIG. 3 is a flowchart illustrating a method implemented in the emulation scenario shown in FIG. 2 according to an embodiment of the present disclosure.

FIG. 3 is a flowchart illustrating a method implemented in the emulation scenario shown in FIG. 2 according to an embodiment of the present disclosure. In the emulation scenario shown in FIG. 2, the method provided by the embodiment of the present disclosure is illustrated as follows.

At block 01, an eNodeB starts a monitoring cycle. The eNodeB monitors 19 cells shown in FIG. 2. In an actual application, several neighboring cells having similar landform and service characteristics may be taken as one monitoring unit.

At block 02, when triggering an A3 event, UE reports its KPI parameters and location coordinate ($U_X, U_Y$) to the eNodeB. In each monitoring cycle, the eNodeB reports the KPI parameters and the location coordinate ($U_X, U_Y$) to an OAM device. The OAM device receives the KPI parameters and location coordinate ($U_X, U_Y$) of each UE triggering the A3 event. The KPI parameters reported by each UE includes maximum $RSRP_s$ and maximum $RSRQ_s$ of a serving cell, and maximum $RSRP_n$ and maximum $RSRQ_n$ of a neighboring cell.

At block 03, in order to be convenient for analyzing data, the OAM device performs preprocessing on the data. The OAM device usually processes the data through a data normalization method.

At block 04, the OAM device classifies UEs triggering the A3 event according to four parameters ($RSRP_s$, $RSRP_n$, $RSRQ_s$ and $RSRQ_n$) of each UE through a dynamic AP algorithm, and set an initial value of a bias parameter p and two step sizes for dynamically adjusting the bias parameter p, so that different numbers of classifications are obtained during the adjustment of the bias parameter p. The different numbers of classifications are evaluated according to a cluster quality evaluation indicator to achieve the optimal number of classifications. In this case, all data points, that is, all UEs triggering the A3 event, are classified into multiple classifications according to the cluster quality evaluation indicator and the number of the multiple classifications is optimal.

At block 05, when the value of the cluster quality evaluation indicator corresponding to the optimal number of classifications is smaller than a threshold E, it is indicated that data points corresponding to the UEs triggering the A3 event have a worse cluster distinguishing performance. That is, the performances of the UEs triggering the A3 event almost have no difference. And thus, it can be determined that there is no disconnected cell in the monitoring region. If the value of the cluster quality evaluation indicator corresponding to the optimal number of classifications is larger than the threshold E, it is indicated that the data points corresponding to the UEs triggering the A3 event have a better cluster distinguishing performance. That is, the performances of the UEs triggering the A3 event have difference. And thus, it can be determined that there is a disconnected cell in the monitoring region.

Figure 4:
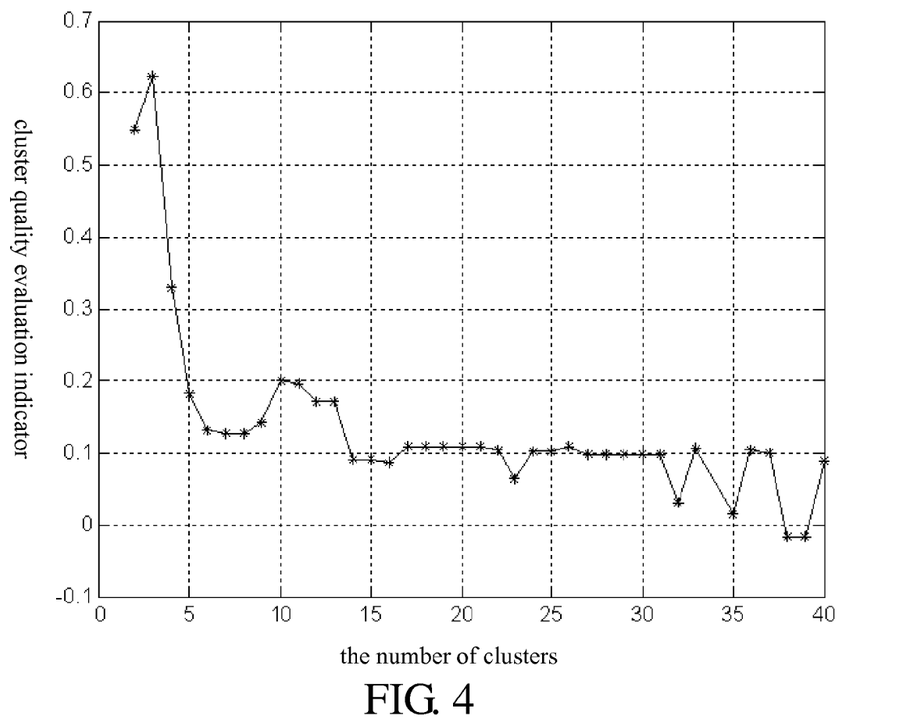
FIG. 4 is a diagram illustrating a process that the value of a cluster quality evaluation indicator dynamically changes along with the change of the number of classifications according to an embodiment of the present disclosure.

In the emulation scenario shown in FIG. 2, the threshold E is set as 0.5. After the preprocessing described at block 03 is performed on the data points obtained at block 02 according to the dynamic AP algorithm described at block 04, optimal cluster processing is performed to determine that the optimal number of classifications is 3. That is, the value of the cluster quality evaluation indicator is the largest value when the number of classifications is 3. In this case, the value of the cluster quality evaluation indicator is 0.6226, which is larger than the threshold E=0.5. It is indicated that the data points have a better cluster distinguishing performance. That is, the performances of the UEs triggering the A3 event have difference. And thus, it can be determined that there is a disconnected cell. FIG. 4 is a diagram illustrating a process that the value of a cluster quality evaluation indicator dynamically changes along with the change of the number of classifications according to an embodiment of the present disclosure. As shown in FIG. 4, the value of cluster quality evaluation indicator corresponding to different numbers of classifications changes. When the number of classifications is 3, the value of the cluster quality evaluation indicator is the largest value, which indicates that the optimal number of classifications is 3. When the value of the cluster quality evaluation indicator is larger than 0.5, it is indicated that there is a disconnected cell in the monitoring region.

At block 06, the OAM device obtains location coordinates ($U_X, U_Y$) of all UEs triggering the A3 event, and maps data points corresponding to UEs in each classification to a network cell topology in the monitoring region according to the optimal number of classifications. In FIG. 2, the optimal number of classifications is 3.

At block 07, if multiple data points in a certain classification are located in one cell and the number of the multiple data points is larger than a predefined threshold ratio, it is determined that the cell is a disconnected cell. In the emulation scenario shown in FIG. 2, suppose the predefined threshold ratio is set as 50%. About 95% data points in a first classification are located in the cell 201, which is larger than 50%, and 100% data points in a second classification are located in the cell 202, which is larger than 50%. Accordingly, it is determined that the cells 201 and 202 are disconnected cells, and disconnection types or disconnection degrees of the cells 201 and 202 are different.

At block 08, the disconnection types of the disconnected cells are determined, and a compensation measurement is triggered for each disconnected cell according to the disconnection type of the disconnected cell.

As shown in FIG. 4, after the preprocessing described at block 03 is performed on the data points obtained at block 02, the UEs triggering the A3 event are classified through the dynamic AP algorithm described at block 04. Different numbers of classifications are obtained through classifying the data points corresponding to the UEs for many times, and the optimal number of classifications is achieved according to the cluster quality evaluation indicator. As shown in FIG. 4, the largest value of the cluster quality evaluation indicator appears when the number of classifications is 3, and thus the optimal number of classifications is 3. In this case, the value of the cluster quality evaluation indicator is 0.6226, which is larger than the threshold E=0.5. It is indicated that the data points corresponding to the UEs triggering the A3 event have a better cluster distinguishing performance, and thus, it can be determined that there is a disconnected cell in the monitoring region during this monitoring cycle.

Figure 5:
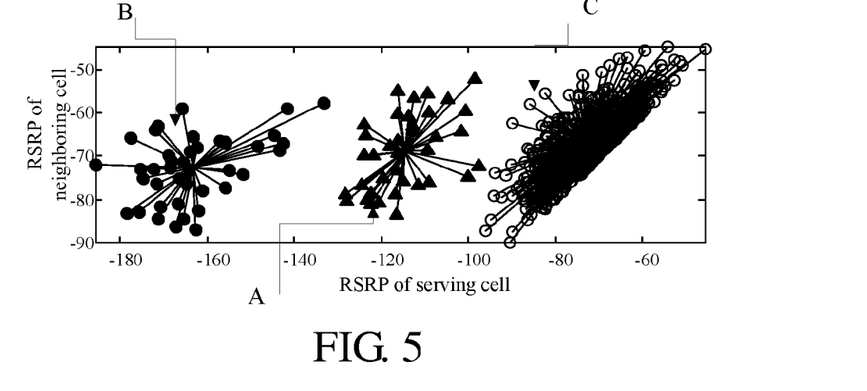
FIG. 5 is a diagram illustrating a cluster result obtained through emulating the method according to an embodiment of the present disclosure.

FIG. 5 is a diagram illustrating a cluster result obtained through emulating the method according to an embodiment of the present disclosure. In FIG. 5, after the preprocessing described at block 03 is performed on the data points obtained at block 02, the UEs triggering the A3 event are classified through the dynamic AP algorithm described at block 04. Different numbers of classifications are obtained through classifying the data points corresponding to the UEs for many times, and the optimal number of classifications is achieved according to the cluster quality evaluation indicator. The optimal number of classifications is 3. A first cluster A and a second cluster B include less data points, and thus belong to abnormal classifications. A third cluster C includes more data points, and thus belongs to a normal classification.

Figure 6:
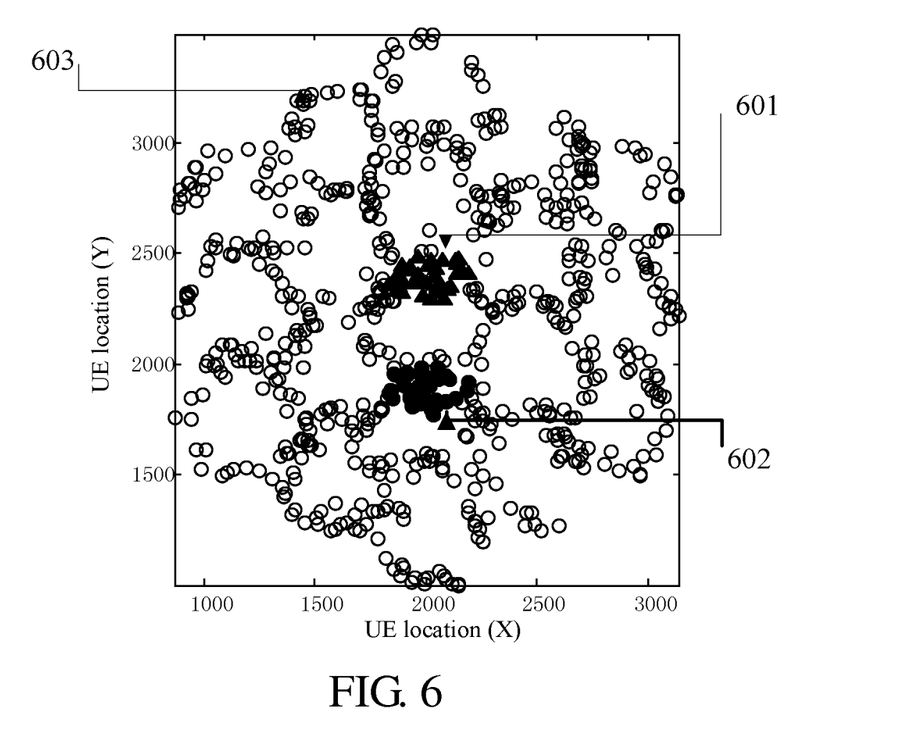
FIG. 6 is a diagram illustrating an application scenario for locating disconnected cells through mapping data points to a radio network cell topology according to an embodiment of the present disclosure.

FIG. 6 is a diagram illustrating an application scenario for locating disconnected cells through mapping data points to a radio network cell topology according to an embodiment of the present disclosure. In FIG. 6, data points in the clusters A, B and C are mapped to a radio network cell topology. 95% data points in the cluster A are located in a region 601, which is larger than the predefined threshold ratio, i.e., 50%. 100% data points in the cluster B are located in a region 602, which is larger than 50%. It is indicated that the regions 601 and 602 are disconnected regions. A region 603 in FIG. 6 is a normal region. Comparing FIG. 6 with FIG. 2, it can be found that the regions 601 and 602 including most abnormal points correspond to the cells 201 and 202 shown in FIG. 2 respectively, that is, the disconnected cells predefined in the emulation scenario. In conclusion, by the method provided by the embodiment of the present disclosure, it can be accurately determined whether there is a disconnected cell in the monitoring region and the disconnected cell can be located successfully.

The foregoing is only preferred embodiments of the present disclosure and is not used to limit the protection scope of the present disclosure. Any modification, equivalent substitution and improvement without departing from the spirit and principle of the present disclosure are within the protection scope of the present disclosure.

What is claimed is:

1. A method for detecting cell disconnection and locating a disconnected cell in a Self-Organizing Network (SON) of a cellular mobile communication system, comprising:

in a monitoring region including multiple cells, reporting, by User Equipment (UE), Key Performance Indicator (KPI) parameters and location information to an evolved Node B (eNodeB) when triggering an A3 event representing that Quality of Service (QoS) of a neighboring cell is better than a predefined offset of a serving cell;

reporting, by the eNodeB, the KPI parameters and the location information to an Operation Administration and Maintenance (OAM) device in each monitoring cycle; and classifying, by the OAM device, UEs according to the KPI parameters and a cluster analysis method; determining according to a cluster analysis result whether there is a disconnected cell in the monitoring region; when determining that there is a disconnected cell in the monitoring region, counting disconnected cells, determining disconnection types of the disconnected cells, locating the disconnected cells according to the location information of the UEs in the SON, and triggering a compensation measurement for each disconnected cell according to the disconnection type of the disconnected cell.

2. The method of claim 1, wherein the cluster analysis method is a dynamic Affinity Propagation (AP) algorithm, comprising:

determining an adjustment range of a bias parameter p, setting a first step size and a second size for dynamically adjusting the bias parameter p, generating multiple cluster results corresponding to different numbers of classifications, and selecting an optimal cluster result from the multiple cluster results according to a cluster quality evaluation indicator.

3. The method of claim 1, wherein the method comprises:

reporting, by the UE, the KPI parameters including a Reference Signal Receiving Power $RSRP_s$, a Reference Signal Receiving Quality $RSRQ_s$, a $RSRP_n$ and a $RSRQ_n$ and a location coordinate $(U_X, U_Y)$ to the eNodeB when triggering the A3 event; reporting, by the eNodeB, the KPI parameters including the $RSRP_s$, the $RSRP_n$, the $RSRQ_s$ and the $RSRQ_n$ and the location coordinate $(U_X, U_Y)$ to the OAM device;

receiving, by the OAM device, the KPI parameters and the location coordinator $(U_X, U_Y)$ of each UE triggering the A3 event, classifying the UEs triggering the A3 event according to the KPI parameters including the $RSRP_s$, the $RSRP_n$, the $RSRQ_s$ and the $RSRQ_n$ of each UE and according to a dynamic AP algorithm, and selecting the optimal number of classifications according to a cluster quantity evaluation indicator;

determining whether a value of the cluster quantity evaluation indicator corresponding to the optimal number of classifications is smaller than a threshold; when determining that the value of the cluster quantity evaluation indicator corresponding to the optimal number of classifications is smaller than the threshold, determining that performances of the UEs triggering the A3 event have no difference, and determining that there is no disconnected cell in the monitoring region; when determining that the value of the cluster quantity evaluation indicator corresponding to the optimal number of classifications is larger than the threshold, determining that the performances of the UEs triggering the A3 event have difference, and determining that there is a disconnected cell in the monitoring region; and obtaining, by the OAM device, location coordinates of the UEs triggering the A3 event, mapping data points corresponding to UEs in each classification to a network cell topology in the monitoring region according to the optimal number of classifications; determining whether multiple data points in a classification are located in one cell and the number of the multiple data points is larger than a predefined threshold ratio; when determining that multiple data points in a classification are located in one cell and the number of the multiple data points is larger than the predefined threshold ratio, determining that the cell is a disconnected cell, counting the disconnected cells and determining the disconnection types of the disconnected cells; when determining that multiple data points in a classification are located in one cell but the number of the multiple data points is not larger than the predefined threshold ratio, determining that there is no disconnected cell.

4. The method of claim 3, wherein the $RSRP_s$ is a maximum reference signal receiving power of a serving cell, the $RSRP_n$ is a maximum reference signal receiving power of a neighboring cell, the $RSRQ_s$ is a maximum reference signal receiving quality of the serving cell and the $RSRQ_n$ is a maximum reference signal receiving power of the neighboring cell, where a subscript s is an initial of the serving cell and a subscript n is an initial of the neighboring cell.

5. The method of claim 3, wherein classifying the UEs triggering the A3 event according to the KPI parameters including the $RSRP_s$, the $RSRP_n$, the $RSRQ_s$ and the $RSRQ_n$ of each UE and according to the dynamic AP algorithm, and selecting the optimal number of classifications according to the cluster quantity evaluation indicator comprises:

in process (a), constructing, by the OAM device, a set $D = \{X_1, X_2, \ldots, X_i, \ldots, X_N\}$ including the UEs triggering the A3 event and the KPI parameters of each UE, wherein N represents the number of the UEs in the set D, the subscript i is a natural number representing a serial number of UE, the largest value of the subscript i is N, $X_i$ represents the $i^{th}$ UE triggering the A3 event, each UE carries four KPI parameters which construct a KPI parameter vector $X_i = (RSRP_{si}, RSRP_{ni}, RSRQ_{si}, RSRQ_{ni})$ of the UE, and the KPI parameter vector is used as a data point participating in the dynamic AP algorithm;

in process (b), classifying all UEs in the set D= $\{X_1, X_2, \ldots, X_i, \ldots, X_N\}$ according to a dynamic AP algorithm, wherein N data points $X_1, X_2, \ldots, X_i, \ldots, X_N$ in the set D participates in the dynamic AP algorithm; and in process (c), evaluating a cluster quality of each data point $X_j$ according to a cluster quality evaluation indicator $$SL(j) = \frac{b(j) - a(j)}{\max\{a(j), b(j)\}},$$

and evaluating cluster qualities corresponding to different numbers of classifications, wherein the subscript j is a natural number representing a serial number of UE and the largest value of the subscript j is N.

6. The method of claim 5, wherein the dynamic AP algorithm comprises:

in process (b1), when i≠k and an Euclidean distance is used as a measurement indicator of similarity degree, calculating a similarity degree s(i,k) between any two data points $X_i$ and $X_k$, where $s(i,k)=-\|X_i-X_k\|^2$, the subscript k is a natural number presenting a serial number of UE, and the largest value of the subscript k is N;

when i=k, defining a bias parameter $p_k=s(k,k)$ of the data point $X_k$; suppose possibilities that all data points become cluster centers are identical, which is represented by $s(k,k)=p_k=p$, constructing a matrix $S=[s(i,k)]_{N\times N}$ according to the similarity degree s(i,k) between any two data points and the bias parameters $p=p_k=s(k,k)$ of the N data points, wherein the number of rows and the number of columns in the matrix are both N; introducing a dynamic adjustment range $p\in[p_{min},p_{max}]$ of the bias parameter p, and the number of classifications corresponding to the adjustment range of the bias parameter p is within $[2,[\sqrt{N}]]$; setting an initial bias parameter $p=p_{max}$;

in process (b2), according to following three formulas associated with a response degree r(i,k) and an action degree a(i,k) between any two data points $X_i$ and $X_k$, performing an iterative operation of a conventional AP cluster algorithm, and during each iterative operation, updating both the r(i,k) and the a(i,k);

$$r(i, k) = s(i, k) - \max_{k' \neq k}\{a(i, k') + s(i, k')\},$$

where k'≠k, and the response degree r(i,k) represents a degree that the data point $X_k$ is suitable as the cluster center of the data point $X_i$;

when i≠k, $$a(i, k) = \min\left\{0, r(k, k) + \sum_{i' \in \{i,k\}} \max\{0, r(i', k)\}\right\};$$

when i=k, $$a(k, k) = \sum_{i' \neq k} \max\{0, r(i', k)\},$$

where i'≠i and i'≠k, and the action degree a(i,k) represents a degree that it is suitable for the data point $X_i$ to select the data point $X_k$ as the cluster center;

in process (b3), introducing a damping factor $\lambda\in[0,1]$ into each iterative operation; according to a response degree and an action degree that are obtained during the last iterative operation of two formulas $r(i,k)^t=(1-\lambda)r(i,k)^{t-1}+\lambda r(i,k)^t$ and $a(i,k)^t=(1-\lambda)a(i,k)^{t-1}+\lambda a(i,k)^t$ and according to the response degree and the action degree that are obtained during the iterative operation in process (b2), performing a weight update operation on the response degree r(i,k) and the action degree a(i,k) during each iterative operation, wherein t represents the number of iterative operations;

in process (b4), after each iterative operation, determining the cluster center of the data point $X_i$ according to a formula $$center_i = \arg\max_k\{r(i, k) + a(i, k)\},$$

wherein $center_i$ is the cluster center of the data point $X_i$, and the number of cluster centers generated after the iterative operation is equal to the number of classifications into which all UEs in $D=\{X_1, X_2, \ldots, X_i, \ldots, X_N\}$ are classified;

in process (b5), during the iterative operation, determining whether the cluster result is stable; when determining that the cluster result is stable, determining that the conventional AP cluster algorithm converges, obtaining a final cluster result and performing process (b7); if the cluster result still oscillates when the number of iterative operations of the conventional AP cluster algorithm has been equal to a maximum value, determining that the convention AP cluster algorithm cannot converge, and performing process (b6);

in process (b6), subtracting a predefined first step size $P_{step1}$ from the value of the bias parameter p, and performing process (b2); and in process (b7), after obtaining a cluster result, subtracting a predefined second step size $p_{step2}$ from the value of the bias parameter p and performing process (b2) until the value of the bias parameter p falls to a floor $p_{min}$ of the adjustment range of the predefined bias parameter p, so that different cluster results corresponding to different numbers of classifications are achieved.

7. The method of claim 5, wherein process (c) comprises:

supposing the number of classifications $c=\{c_1, c_2, \ldots, c_i, \ldots, c_K\}$ is K, $X_j$ belongs to a classification $c_i$, and a(j) is an average value of distances between the data point $X_j$ and other data points in the classification $c_i$; if $d(X_j,c_{other})$ is an average value of distances between the data point $X_j$ and all data points in another classification $c_{other}$, $b(j)=\min\{d(X_j,c_{other})\}$ is a minimum one of average values, each of which is an average value of distances between the data point $X_j$ and data points in one of other classifications $c_{other}$, where $c_{other}\in\{c_1, c_2, \ldots, c_k\}$ and $c_{other}\neq c_i$; the average cluster quality of the classification $c_i$ is $$SL_{av}(c_i) = \frac{1}{m}\sum_{j=1}^{m} SL(j),$$

wherein m is the number of data points in the classification $c_i$; obtaining the minimum cluster quality $SL_{min}(K)=\min\{SL_{av}(c_i)\}$ from $SL_{av}(c_i)$ of $c=\{c_1, c_2, \ldots, c_K\}$, and taking the minimum cluster quality as a classification with the worst cluster quality when the data points are classified into K classifications; the cluster quality includes an intra-classification compact degree and an inter-classification distinguishing degree; searching a maximum value from multiple cluster quality evaluation indicators $\{SL_{min}(K)\}$ corresponding to multiple classifying results, wherein the number of classifications corresponding to each of the multiple classifying results is within a range from 2 to $\lceil\sqrt{N}\rceil$ and is determined by the bias parameter $p\in\{p_{min}, p_{max}\}$; K corresponding to the maximum value is the optimal number of classifications $$\text{opti\_cluster} = \arg\max_{K}\{SL_{min}(K)\}.$$

* * * * *